US012600171B2

(12) United States Patent
Thuilliez et al.

(10) Patent No.: US 12,600,171 B2
(45) Date of Patent: Apr. 14, 2026

(54) COMPOSITE COMPRISING A METAL REINFORCING ELEMENT AND AN ELASTOMER COMPOSITION CONTAINING AN ADHESION PROMOTING RESIN

(71) Applicant: COMPAGNIE GENERALE DES ETABLISSEMENTS MICHELIN, Clermont-Ferrand (FR)

(72) Inventors: Anne-Lise Thuilliez, Clermont-Ferrand (FR); Odile Gavard-Lonchay, Clermont-Ferrand (FR); Christophe Le Clerc, Clermont-Ferrand (FR); Julien Letessier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 243 days.

(21) Appl. No.: 18/284,679

(22) PCT Filed: Mar. 21, 2022

(86) PCT No.: PCT/FR2022/050512

§ 371 (c)(1),
(2) Date: Sep. 28, 2023

(87) PCT Pub. No.: WO2022/207998

PCT Pub. Date: Oct. 6, 2022

(65) Prior Publication Data

US 2024/0174024 A1 May 30, 2024

(30) Foreign Application Priority Data

Mar. 29, 2021 (FR) ...................................... 2103178

(51) Int. Cl.
*B60C 9/00* (2006.01)

(52) U.S. Cl.
CPC .... *B60C 9/0007* (2013.01); *B60C 2009/0021* (2013.01)

(58) Field of Classification Search
CPC . B60C 1/00; B60C 9/0007; B60C 2009/0021; D07B 1/0666; D07B 2205/3089; D07B 2801/18; C08L 7/00; C08L 61/12; C08K 3/04; C08K 5/09; C08K 3/22
USPC ...................................................... 428/292.1
See application file for complete search history.

(56) References Cited

U.S. PATENT DOCUMENTS

| | | | |
|---|---|---|---|
| 5,284,713 A | 2/1994 | Muraoka et al. | |
| 6,774,255 B1 | 8/2004 | Tardivat et al. | |
| 7,250,463 B2 | 7/2007 | Durel et al. | |
| 7,300,970 B2 | 11/2007 | Durel et al. | |
| 7,488,768 B2 | 2/2009 | Tardivat et al. | |
| 7,491,767 B2 | 2/2009 | Durel et al. | |
| 8,492,475 B2 | 7/2013 | Araujo Da Silva et al. | |
| 9,010,393 B2 | 4/2015 | Araujo Da Silva et al. | |
| 10,173,468 B2 | 1/2019 | Thuilliez | |
| 10,202,471 B2 | 2/2019 | Ugolnikov et al. | |
| 10,544,292 B2 | 1/2020 | Doisneau et al. | |
| 10,544,298 B2 | 1/2020 | Doisneau et al. | |
| 10,590,225 B2 | 3/2020 | Thuilliez et al. | |
| 10,604,613 B2 | 3/2020 | Doisneau et al. | |
| 10,647,848 B2 | 5/2020 | Thuilliez et al. | |
| 10,711,131 B2 | 7/2020 | Thuilliez et al. | |
| 10,711,132 B2 | 7/2020 | Thuilliez et al. | |
| 10,737,532 B2 | 8/2020 | Thuilliez | |
| 11,034,780 B2 | 6/2021 | Ugolnikov et al. | |
| 11,091,580 B2 | 8/2021 | Doisneau et al. | |
| 12,134,694 B2 | 11/2024 | Thuilliez et al. | |
| 2004/0051210 A1 | 3/2004 | Tardivat et al. | |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2011/0152458 A1 | 6/2011 | Araujo Da Silva et al. | |
| 2015/0337111 A1* | 11/2015 | Belin | B60C 1/0041 524/381 |
| 2017/0165942 A1 | 6/2017 | Michoud et al. | |
| 2017/0226322 A1 | 8/2017 | Thuilliez | |
| 2017/0239991 A1 | 8/2017 | Thuilliez | |
| 2018/0273670 A1 | 9/2018 | Thuilliez et al. | |
| 2018/0362754 A1 | 12/2018 | Thulliez et al. | |

(Continued)

FOREIGN PATENT DOCUMENTS

| | | |
|---|---|---|
| EP | 3102645 | 12/2016 |
| EP | 3476624 A1 | 5/2019 |

(Continued)

OTHER PUBLICATIONS

International Search Report dated Jun. 15, 2022, in corresponding PCT/FR2022/050512 (6 pages).

*Primary Examiner* — Camie S Thompson
(74) *Attorney, Agent, or Firm* — VENABLE LLP

(57) ABSTRACT

A composite comprises at least one reinforcing element exhibiting a surface comprising an alloy of copper and zinc, the reinforcing element being embedded in an elastomeric composition based on at least a diene elastomer, a reinforcing filler, a sulfur crosslinking system and a phenol/aldehyde resin based on at least one aromatic polyphenol and on at least one dialdehyde compound comprising two aldehyde functions, in which the content of phenol/aldehyde resin is less than 10 phr.

15 Claims, No Drawings

(56) References Cited

U.S. PATENT DOCUMENTS

| | | | |
|---|---|---|---|
| 2022/0025163 | A1 | 1/2022 | Gavard-Lonchay et al. |
| 2022/0227947 | A1* | 7/2022 | Pataut ........................ C08J 5/04 |
| 2023/0077022 | A1 | 3/2023 | Thuilliez et al. |

FOREIGN PATENT DOCUMENTS

| | | | |
|---|---|---|---|
| FR | 3041647 | A1 | 3/2017 |
| FR | 3089987 | A1 | 6/2020 |
| WO | 97/36724 | A2 | 10/1997 |
| WO | 99/16600 | A1 | 4/1999 |
| WO | 02/30939 | A1 | 4/2002 |
| WO | 02/31041 | A1 | 4/2002 |
| WO | 03/002648 | A1 | 1/2003 |
| WO | 03/002649 | A1 | 1/2003 |
| WO | 03/016387 | A1 | 2/2003 |
| WO | 2006/125532 | A1 | 11/2006 |
| WO | 2006/125533 | A1 | 11/2006 |
| WO | 2006/125534 | A1 | 11/2006 |
| WO | 2016/058942 | A1 | 4/2016 |
| WO | 2016/058943 | A1 | 4/2016 |
| WO | 2017/103404 | A1 | 6/2017 |

* cited by examiner

COMPOSITE COMPRISING A METAL REINFORCING ELEMENT AND AN ELASTOMER COMPOSITION CONTAINING AN ADHESION PROMOTING RESIN

TECHNICAL FIELD OF THE INVENTION

The present invention relates to the field of reinforced rubber products, in particular intended for pneumatic or non-pneumatic tyres, and also to the articles comprising such reinforced products.

PRIOR ART

The reinforcing plies of pneumatic tyres or reinforced rubber articles usually comprise a "calendering" rubber composition and metallic reinforcing cords. The calendering composition must correspond to numerous characteristics, such as good properties of adhesion to the metallic reinforcing cords, hysteresis properties conferring, on the plies, a low contribution to the rolling resistance, and also good resistance to cracking, this being the case throughout the life of the tyre.

The adhesion between the metallic cords and the surrounding rubber is one of the key properties for the effectiveness of the reinforcing plies of pneumatic tyres or of reinforced rubber articles. The calendering compositions, which comprise a diene elastomer, in particular natural rubber, a reinforcing filler, also generally comprise a specific vulcanization system and, as adhesion promoter, cobalt salts. This specific vulcanization system usually comprises a high sulfur content, a high ratio by weight of zinc oxide to stearic acid, a "slow" vulcanization accelerator and a vulcanization retarder. In these systems, the adhesion between the calendering composition and the metallic cord is created via the phenomenon of sulfidation of the brass-coated surface of the cord, the cobalt salts having an effect on the durability of the adhesion.

Many studies have been carried out by manufacturers of pneumatic tyres in order to limit the contents of sulfur, metal oxide and/or cobalt salts while maintaining one or more of the performance qualities of the calendering compositions, and also their durability. Thus, the documents WO2016/058942 and WO2016/0589431 provide for the sheathing of the metallic reinforcing elements, making it possible to lower the contents of sulfur and zinc oxide in the compositions for calendering the reinforcers thus sheathed and to reduce, indeed even eliminate, cobalt from the calendering composition. However, this approach requires sheathing the reinforcing elements.

The document EP 3 476 624 teaches a composite comprising an elastomeric composition and a reinforcing element, the surface of which comprises brass and from 1% to 10% by weight of one or more metals chosen from cobalt, nickel, tin, indium, manganese, iron, bismuth and molybdenum. The examples show that elastomeric compositions comprising an adhesion-promoting resin (resorcinol/hexa(methoxymethyl)melamine system, denoted H3M) and not comprising cobalt salts, exhibit good retention over time of the adhesion properties.

However, the combination of H3M with a phenolic compound, such as resorcinol, the usage of which it is furthermore sought to limit because of its HSE impact, produces formaldehyde during the curing of the rubber composition. Consequently, many studies are targeted at replacing this methylene acceptor/donor system with a system with a lower environmental impact. The document WO2017/103404 shows, for example, the example of a rubber composition which can be used for the calendering of reinforcing elements comprising a phloroglucinol/1,4-benzenedicarboxaldehyde system used at high contents to stiffen the rubber composition. This document does not address the issue of the adhesion to the reinforcing elements.

Continuing its research studies, the Applicant Company has discovered a composite comprising at least one reinforcing element exhibiting a surface comprising an alloy of copper and zinc, said reinforcing element being embedded in an elastomeric composition based on at least a diene elastomer, a reinforcing filler, a sulfur crosslinking system and a phenol/aldehyde resin based:

- on at least one aromatic polyphenol comprising at least one aromatic nucleus bearing at least two hydroxyl functions in the meta position with respect to each other, the two positions ortho to at least one of the hydroxyl functions being unsubstituted, and
- on at least one dialdehyde compound comprising two aldehyde functions, in which the content of phenol/aldehyde resin is less than 10 phr, preferably less than 6 phr.

DETAILED DESCRIPTION OF THE INVENTION

The invention relates to at least one of the following implementations:

1. Composite comprising at least one reinforcing element exhibiting a surface comprising an alloy of copper and zinc, said reinforcing element being embedded in an elastomeric composition based on at least a diene elastomer, a reinforcing filler, a sulfur crosslinking system and a phenol/aldehyde resin based:
   - on at least one aromatic polyphenol comprising at least one aromatic nucleus bearing at least two hydroxyl functions in the meta position with respect to each other, the two positions ortho to at least one of the hydroxyl functions being unsubstituted, and
   - on at least one dialdehyde compound comprising two aldehyde functions, in which the content of phenol/aldehyde resin is less than 10 phr, preferably less than 6 phr.
2. Composite according to the preceding implementation, in which the dialdehyde compound comprises at least one aromatic nucleus, which is optionally substituted.
3. Composite according to the preceding implementation, in which the two positions meta to at least one aldehyde function are unsubstituted.
4. Composite according to either of the two preceding implementations, in which the dialdehyde compound is chosen from the compounds comprising an aromatic nucleus having 6 carbon atoms, preferentially chosen from 1,4-benzenedicarboxaldehyde and 1,3-benzenedicarboxaldehyde.
5. Composite according to any one of the preceding implementations, in which the crosslinking system comprises a metal oxide, a stearic acid derivative and a vulcanization accelerator, the sulfur content being between 1 and 5 phr, and the ratio by weight of metal oxide to stearic acid derivative being less than 3.
6. Composite according to any one of the preceding implementations, in which the surface of the reinforcing element comprises from 55% to 75% by weight of copper.
7. Composite according to any one of the preceding implementations, in which the elastomeric composition comprises at least 50 phr, preferentially at least 70 phr, preferably at least 90 phr, of at least one isoprene elastomer and very preferentially 100 phr of at least one isoprene elastomer.

8. Composite according to the preceding implementation, in which the isoprene elastomer is selected from the group consisting of synthetic polyisoprenes, natural rubber, isoprene copolymers and their mixtures, preferentially selected from the group consisting of natural rubber and polyisoprenes comprising a content by weight of cis-1,4-bonds of at least 90%, more preferentially of at least 98%, with respect to the weight of isoprene elastomer, and their mixtures.

9. Composite according to any one of the preceding implementations, in which the elastomeric composition comprises from 1 to 4 phr of sulfur.

10. Composite according to any one of the preceding implementations, in which the sulfur/vulcanization accelerator ratio by weight is less than or equal to 5, preferably less than or equal to 4.

11. Composite according to any one of the preceding implementations, in which the metal oxide of the crosslinking system is zinc oxide.

12. Composite according to any one of the preceding implementations, in which the elastomeric composition does not comprise cobalt salts or comprises less than 1 phr, preferably less than 0.5 phr, thereof.

13. Composite according to any one of the preceding implementations, in which the reinforcing filler of the elastomeric composition predominantly comprises carbon black.

14. Composite according to any one of implementations 1 to 12, in which the reinforcing filler of the elastomeric composition predominantly comprises silica.

15. Composite according to the preceding implementation, in which the elastomeric composition comprises an agent for coupling the silica, the content of coupling agent being in a range extending from 5% to 18% by weight, with respect to the amount of silica, preferentially in a range extending from 8% to 12% by weight, with respect to the amount of silica.

16. Finished or semi-finished article comprising a composite according to any one of the preceding implementations.

17. Pneumatic tyre comprising a composite according to any one of implementations 1 to 15.

Definitions

The compounds comprising carbon which are mentioned in the description can be of fossil or biobased origin. In the latter case, they can partially or completely result from biomass or be obtained from renewable starting materials resulting from biomass. Polymers, plasticizers, fillers, and the like, are concerned in particular.

Composite

The invention relates to a composite comprising at least one reinforcing element exhibiting a surface comprising an alloy of copper and zinc, said reinforcing element being embedded in an elastomeric composition.

The expression composite "comprising at least one reinforcing element, said reinforcer being embedded in an elastomeric composition" should be understood as meaning a composite comprising the reinforcing element and said composition, it having been possible for the composition to react with the surface of the reinforcing element during the various phases of manufacture of the composite, in particular during the crosslinking of the composition or during the preparation of the composite before crosslinking of the composition, said reinforcing element being completely covered with said composition.

Said reinforcing element is a threadlike element. It can be completely or partly metallic. The term "threadlike element" is understood to mean an element exhibiting a length at least 10 times greater than the greatest dimension of its cross section, whatever the shape of the latter: circular, elliptical, oblong, polygonal, in particular rectangular or square or oval. In the case of a rectangular cross section, the threadlike element exhibits the form of a strip.

Said reinforcing element comprises a metallic surface.

The metallic surface of the reinforcing element constitutes at least a part and preferentially all of the surface of said element and is intended to come directly into contact with the elastomeric composition. Preferably, the reinforcing element is metallic, that is to say constituted of a metallic material. Preferentially, the reinforcing element is a steel reinforcing element coated with a metallic surface as defined in the present document.

The steel of the steel reinforcing element is preferentially a carbon steel or a stainless steel. When the steel is a carbon steel, its carbon content, expressed as % by weight, is preferably of between 0.01% and 1.2% or between 0.05% and 1.2%, or else between 0.2% and 1.2%, in particular between 0.4% and 1.1%. When the steel is stainless, it preferably comprises at least 11% by weight of chromium and at least 50% by weight of iron.

The reinforcing element exhibits a mechanical strength ranging from 1000 MPa to 5000 MPa. Such mechanical strengths correspond to the grades of steel commonly encountered in the tyre field, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths optionally making possible an improved reinforcement of the elastomeric composition in which the reinforcing element is embedded and a lightening of the elastomeric composition thus reinforced.

The elastomeric composition coats the entire reinforcing element, with the possible exception of the cutting planes of the composite.

Preferably, the metallic surface of the reinforcing element comprises from 55% to 75% by weight of copper.

As certain metals are subject to oxidation on contact with ambient air, the metal can be partly oxidized.

According to a preferred embodiment, the composite is a reinforced product which comprises several reinforcing elements as defined above and a calendering elastomeric composition in which the reinforcing elements are embedded, the calendering elastomeric composition consisting of the elastomeric composition of the composite according to the invention. According to this embodiment, the reinforcing elements are generally arranged side by side along a main direction. For an application envisaged in a pneumatic tyre, the composite can thus constitute a reinforcement for a pneumatic tyre.

The composite in accordance with the invention can be in the uncured state (before crosslinking of the elastomeric composition) or in the cured state (after crosslinking of the elastomeric composition). The composite is cured after bringing the reinforcing element(s) into contact with the elastomeric composition described in the present document.

The composite can be manufactured by a process which comprises the following stages:

producing two layers of the elastomeric composition of the composite according to the invention, sandwiching the reinforcing element(s) in the two layers by depositing it/them between the two layers, if appropriate, curing the composite.

Alternatively, the composite can be manufactured by depositing the reinforcing element on a portion of a layer, the layer is then folded over on itself to cover the reinforcing element, which is thus sandwiched over its entire length or a part of its length.

The layers can be produced by calendering. During the curing of the composite, the elastomeric composition is crosslinked.

When the composite is intended to be used as reinforcement in a pneumatic tyre, the curing of the composite generally takes place during the curing of the pneumatic tyre.

Diene Elastomers

The composite according to the invention comprises an elastomeric composition based on at least one diene elastomer. It should be remembered that the term "elastomer of the diene type" should be understood as meaning an elastomer which results at least in part (i.e. a homopolymer or a copolymer) from diene monomers (monomers bearing two conjugated or non-conjugated carbon-carbon double bonds).

These diene elastomers can be classified into two categories: "essentially unsaturated" or "essentially saturated". The term "essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15% (mol %), of units of diene origin). The diene elastomers included in the composition according to the invention are preferentially essentially unsaturated.

Diene elastomer capable of being used in the compositions in accordance with the invention is understood in particular to mean:

a) any homopolymer of a conjugated or non-conjugated diene monomer having from 4 to 18 carbon atoms;
b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

The diene elastomer is preferably a diene elastomer of the highly unsaturated type, in particular a diene elastomer selected from the group consisting of natural rubber (NR), synthetic polyisoprenes (IRs), polybutadienes (BRs), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), ethylene/butadiene copolymers (EBRs) and the mixtures of such copolymers.

The above diene elastomers can, for example, be block, random, sequential or microsequential elastomers and be prepared in dispersion or in solution; they can be coupled and/or star-branched or also functionalized with a coupling and/or star-branching or functionalization agent, for example epoxidized.

Preferably, the elastomeric composition of the composite according to the invention comprises at least 50 phr, preferentially at least 70 phr, preferably at least 90 phr, of at least one isoprene elastomer. In a highly preferred embodiment, the elastomeric composition of the composite according to the invention comprises 100 phr of at least one isoprene elastomer.

The term "isoprene elastomer" is understood to mean an isoprene homopolymer or copolymer, in other words a diene elastomer selected from the group consisting of natural rubber (NR), which may be plasticized or peptized, synthetic polyisoprenes (IRs), the various isoprene copolymers, in particular isoprene/styrene (SIRs), isoprene/butadiene (BIRs) or isoprene/butadiene/styrene (SBIRs) copolymers, and the mixtures of these elastomers.

Preferably, the isoprene elastomer is selected from the group consisting of synthetic polyisoprenes, natural rubber, isoprene copolymers and their mixtures, preferably from the group consisting of natural rubber, polyisoprenes comprising a content by weight of cis-1,4-bonds of at least 90%, more preferentially of at least 98%, with respect to the weight of isoprene elastomer, and their mixtures. Very preferably, the isoprene elastomer is natural rubber.

Reinforcing Filler

The elastomeric composition of the composite according to the invention comprises a reinforcing filler. Use may be made of any type of reinforcing filler known for its abilities to reinforce an elastomeric composition which can be used in the manufacture of pneumatic tyres, for example an organic filler, such as carbon black, a reinforcing inorganic filler, such as silica, or also a blend of these two types of filler, in particular a blend of carbon black and of silica.

All carbon blacks, in particular blacks of the HAF, ISAF or SAF type, conventionally used in tyres ("tyre-grade" blacks) are suitable as carbon blacks. Among the latter, mention will more particularly be made of the reinforcing carbon blacks of the 100, 200 or 300 series (ASTM grades), such as, for example, the N115, N134, N234, N326, N330, N339, N347 or N375 blacks, or also, depending on the applications targeted, blacks of higher series (for example N660, N683 or N772). The carbon blacks might, for example, be already incorporated in an isoprene elastomer in the form of a masterbatch (see, for example, Applications WO 97/36724 and WO 99/16600). The BET specific surface of the carbon blacks is measured according to Standard D6556-10 [multipoint (a minimum of 5 points) method—gas: nitrogen—relative pressure $p/p_0$ range: 0.1 to 0.3].

The term "reinforcing inorganic filler" should be understood in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of pneumatic tyres, in other words capable of replacing, in its reinforcing role, a conventional tyre-grade carbon black;

such a filler is generally characterized, in a known manner, by the presence of hydroxyl (—OH) groups at its surface.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET surface and also a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

The physical state under which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers.

The reinforcing inorganic filler used, in particular if it is silica, preferably has a BET surface of between 45 and 400 $m^2/g$, more preferentially of between 60 and 300 $m^2/g$.

Preferentially, the elastomeric composition of the composite according to the invention comprises from 10 to 100 phr, more preferentially from 10 to 80 phr and preferably from 10 to 60 phr of carbon black, the optimum being, in a known way, different depending on the particular applications targeted: the level of reinforcement expected with regard to a bicycle pneumatic tyre, for example, is of course less than that required with regard to a pneumatic tyre capable of running at high speed in a sustained manner, for example a motorcycle tyre, a tyre for a passenger vehicle or for a utility vehicle, such as a heavy-duty vehicle. In a preferred arrangement, the reinforcing filler predominantly comprises carbon black and preferably consists of carbon black.

Preferentially, the elastomeric composition of the composite according to the invention comprises from 10 to 150 phr, preferably from 10 to 100 phr, of silica. In a preferred arrangement, the reinforcing filler predominantly comprises silica and preferably consists of silica.

In order to couple the reinforcing inorganic filler to the elastomer, use may optionally be made, in a known way, of an at least bifunctional coupling agent (or bonding agent) intended to provide a satisfactory connection, of chemical and/or physical nature, between the inorganic filler (surface of its particles) and the elastomer, in particular organosilanes or polyorganosiloxanes which are bifunctional.

Use may in particular be made of silane polysulfides, referred to as "symmetrical" or "asymmetrical" depending on their specific structure, such as described, for example, in Applications WO 03/002648 (or US 2005/016651) and WO 03/002649 (or US 2005/016650).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferential examples, of bis(mono($C_1$-$C_4$)alkoxyldi($C_1$-$C_4$) alkylsilylpropyl) polysulfides (in particular disulfides, trisulfides or tetrasulfides), more particularly bis(monoethoxydimethylsilylpropyl) tetrasulfide, such as described in Patent Application US 2004/132880.

Mention will in particular be made, as coupling agent other than alkoxysilane polysulfide, of bifunctional POSs (polyorganosiloxanes) or also of hydroxysilane polysulfides, such as described in Patent Applications WO 02/30939 and WO 02/31041, or also of silanes or POSs bearing azodicarbonyl functional groups, such as described, for example, in Patent Applications WO 2006/125532, WO 2006/125533 and WO 2006/125534.

In the elastomeric compositions in accordance with the invention, the content of coupling agent is preferentially in a range extending from 5% to 18% by weight, with respect to the amount of silica, preferentially in a range extending from 8% to 12% by weight, with respect to the amount of silica.

A person skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyl sites, making it possible to establish the bond between the filler and the elastomer in the presence or absence of a covering or coupling agent.

Crosslinking System

The elastomeric composition of the composite according to the invention comprises a sulfur-based crosslinking system comprising a metal oxide, a stearic acid derivative and a vulcanization accelerator. This is then referred to as a vulcanization system. The sulfur can be provided in any form, in particular in the form of molecular sulfur or of a sulfur-donating agent.

The sulfur is used at a content preferentially of between 1 and 5 phr, in particular ranging from 1 to 4 phr. This content, although low compared to the usual calendering compositions, is sufficient in the context of the invention to ensure both good crosslinking of the elastomeric composition and sufficient and lasting adhesion to the metallic reinforcing element.

The vulcanization accelerator is used at a preferential content such that the sulfur/vulcanization accelerator ratio by weight is less than or equal to 5, preferably less than or equal to 4.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to "MBTS"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TBSI"), tetrabenzylthiuram disulfide ("TBZTD"), zinc dibenzyldithiocarbamate ("ZBEC") and the mixtures of these compounds.

The metal oxide to stearic acid derivative ratio by weight in the crosslinking system is preferentially less than 3. The metal oxide is preferentially zinc oxide.

The crosslinking system can also optionally comprise a vulcanization retarder.

Phenol/Aldehyde Resin

In accordance with the invention, the elastomeric composition of the composite according to the invention is based on a phenol/aldehyde resin based:

- on at least one aromatic polyphenol comprising at least one aromatic nucleus bearing at least two hydroxyl functions in the meta position with respect to each other, the two positions ortho to at least one of the hydroxyl functions being unsubstituted, and
- on at least one dialdehyde compound comprising two aldehyde functions.

Preferably, the content of phenol/aldehyde resin in the elastomeric composition of the composite according to the invention is less than 10 phr, preferably less than 6 phr. The term "content of phenol/aldehyde resin" is understood to mean the sum of the contents of aromatic polyphenol and of aldehyde compound based on the phenol/aldehyde resin. These levels make it possible for the resin to play its role of adhesion promoter without significantly modifying the stiffness of the mixture.

Aromatic Polyphenol

In one embodiment, the aromatic polyphenol can be a simple molecule comprising one or more aromatic nuclei, at least one of these aromatic nuclei, indeed even each aromatic nucleus, bearing at least two hydroxyl functional groups in the meta position with respect to each other, the two positions ortho to at least one of the hydroxyl functional groups being unsubstituted. Such a simple molecule does not comprise a repeat unit.

In another embodiment, the aromatic polyphenol can be a precondensed resin based:

- on at least one aromatic polyphenol comprising at least one aromatic nucleus bearing at least two hydroxyl functional groups in the meta position with respect to each other, the two positions ortho to at least one of the hydroxyl functional groups being unsubstituted; and
- on at least one dialdehyde compound comprising two aldehyde functions.

Such a precondensed resin based on aromatic polyphenol is in accordance with the invention and comprises, unlike the simple molecule described above, a repeat unit. In the case in point, the repeat unit comprises at least one aromatic nucleus bearing at least two hydroxyl functions in the meta position with respect to each other.

In another embodiment, the aromatic polyphenol is a mixture of an aromatic polyphenol forming a simple molecule and of a precondensed resin based on aromatic polyphenol.

In the specific embodiments which follow, the aromatic nucleus or nuclei of the aromatic polyphenol are described. For the sake of clarity, the "aromatic polyphenol" is described therein in its simple molecule form. This aromatic polyphenol will subsequently be able to be condensed and will define in part the repeat unit.

In a preferred embodiment, the aromatic nucleus of the aromatic polyphenol bears three —O—H groups in the meta position with respect to one another.

Preferably, the two positions ortho to each —O—H group of the aromatic polyphenol are unsubstituted. This is understood to mean that the two carbon atoms located on either side of (in the position ortho to) the carbon atom bearing the —O—H group bear a simple hydrogen atom.

More preferentially still, the remainder of the aromatic nucleus of the aromatic polyphenol is unsubstituted. This is understood to mean that the other carbon atoms of the remainder of the aromatic nucleus (those other than the carbon atoms bearing the —O—H groups) bear a simple hydrogen atom.

In one embodiment, the aromatic polyphenol comprises several aromatic nuclei, at least two of them each bearing at least two —O—H groups in the meta position with respect to each other, the two positions ortho to at least one of the —O—H groups of at least one aromatic nucleus being unsubstituted.

In a preferred embodiment, at least one of the aromatic nuclei of the aromatic polyphenol bears three —O—H groups in the meta position with respect to one another.

Preferably, the two positions ortho to each —O—H group of at least one aromatic nucleus are unsubstituted.

More preferentially still, the two positions ortho to each —O—H group of each aromatic nucleus are unsubstituted.

Advantageously, the or each aromatic nucleus of the aromatic polyphenol is a benzene nucleus.

Mention may in particular be made, as example of aromatic polyphenol comprising just one aromatic nucleus, of resorcinol and phloroglucinol, of respective formulae I and II:

(I)

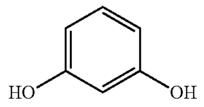

(II)

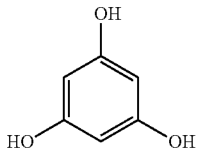

By way of examples, in the case where the aromatic polyphenol comprises several aromatic nuclei, at least two of these aromatic nuclei, which are identical or different, are chosen from those of general formulae:

(III-a)

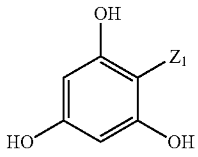

(III-b)

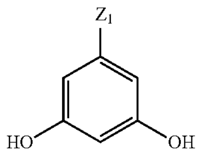

(III-c)

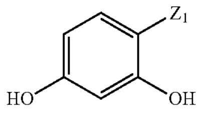

(III-d)

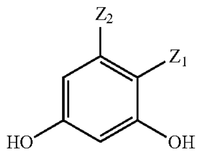

in which the symbols $Z_1$ and $Z_2$, which are identical or different, if there are several on the same aromatic nucleus, represent an atom (for example carbon, sulfur or oxygen) or a bonding group, by definition at least divalent, which connects at least these two aromatic nuclei to the remainder of the aromatic polyphenol.

Another example of aromatic polyphenol is 2,2',4,4'-tetrahydroxydiphenyl sulfide, having the following formula:

(IV)

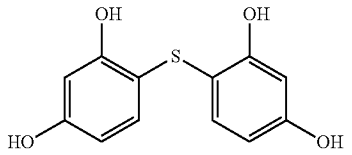

Another example of aromatic polyphenol is 2,2',4,4'-tetrahydroxybenzophenone, of following formula:

(V)

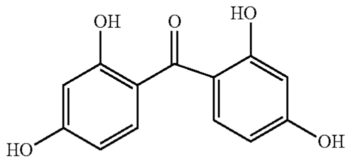

It is noted that each compound IV and V is an aromatic polyphenol comprising two aromatic nuclei (of formulae III-c), each of which bears at least two (in the case in point two) —O—H groups in the meta position with respect to each other.

It is noted that, in the case of an aromatic polyphenol comprising at least one aromatic nucleus in accordance with the formula III-b, the two positions ortho to each —O—H group of at least one aromatic nucleus are unsubstituted. In the case of an aromatic polyphenol comprising several aromatic nuclei in accordance with the formula III-b, the two positions ortho to each —O—H group of each aromatic nucleus are unsubstituted.

According to one embodiment of the invention, the aromatic polyphenol is selected from the group consisting of resorcinol I, phloroglucinol II, 2,2',4,4'-tetrahydroxydiphenyl sulfide IV, 2,2',4,4'-tetrahydroxybenzophenone V and the mixtures of these compounds. In a particularly advantageous embodiment, the aromatic polyphenol is phloroglucinol II.

Dialdehyde Compound

Preferably, the dialdehyde compound is an aromatic dialdehyde compound. Such an aldehyde is very advantageous because it makes it possible to avoid the production of formaldehyde, unlike conventional methylene donors. An aromatic dialdehyde is a compound comprising at least one aromatic nucleus, this aromatic nucleus bearing at least two aldehyde functions.

In a preferred arrangement, the aromatic dialdehyde compound is an aldehyde of formula A:

(A)

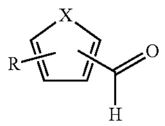

in which X comprises N, S or O and R represents —CHO.

According to a preferred embodiment, X represents O. The aromatic dialdehyde compound is then of formula Bb:

(Bb)

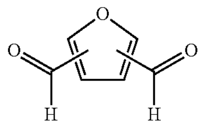

In this embodiment, the aromatic dialdehyde compound is preferentially 2,5-furanedicarboxaldehyde.

In another preferential embodiment, X comprises N. In an alternative form of this embodiment, X represents NH. The aromatic dialdehyde compound is then of formula Ca:

(Ca)

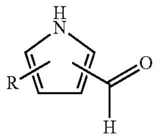

Preferably, in this alternative form, the aromatic dialdehyde compound is 2,5-1H-pyrroledicarboxaldehyde.

In another alternative form of this embodiment, X represents NR1 with R1 representing a radical selected from the group consisting of alkyl, aryl, arylalkyl, alkylaryl and cycloalkyl radicals. The aromatic dialdehyde compound is then of formula Cb:

(Cb)

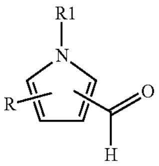

In another preferential embodiment, X comprises S. In an alternative form of this embodiment, X represents S and the aromatic dialdehyde compound is then of formula Da:

(Da)

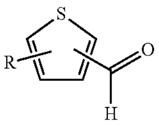

Preferably, in this alternative form, the aromatic dialdehyde compound is 2,5-thiophenedicarboxaldehyde.

In another alternative form of this embodiment, X represents SR2 with R2 representing a radical selected from the group consisting of alkyl, aryl, arylalkyl, alkylaryl and cycloalkyl radicals. The aromatic dialdehyde compound is then of formula db:

(Db)

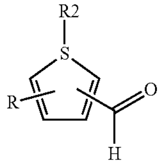

In another alternative form of this embodiment, X represents R3-S—R2 with R2 and R3 each representing, independently of each other, a radical selected from the group consisting of alkyl, aryl, arylalkyl, alkylaryl and cycloalkyl radicals. The aromatic dialdehyde compound is then of formula Dc:

(Dc)

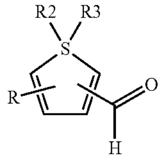

In another alternative form of this embodiment, X represents S═O. The aromatic dialdehyde compound is then of formula Dd:

(Dd)

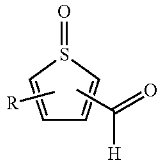

In another alternative form of this embodiment, X represents O═S═O. The aromatic dialdehyde compound is then of formula De:

(De)

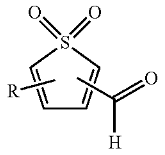

Among the various embodiments described above, preference will be given to the embodiments and alternative forms in which X represents NH, S or O. In these embodiments and alternative forms, preferentially R, which represents the —CHO group, will be in the 5 position and the —CHO group will be in the 2 position on the aromatic nucleus.

Very preferentially, the aromatic aldehyde is selected from the group consisting of 1,4-benzenedicarboxaldehyde, 1,3-benzenedicarboxaldehyde, 2,5-furandicarboxaldehyde and the mixtures of these compounds, and very preferentially 1,4-benzenedicarboxaldehyde.

Various Additives

The elastomeric composition of the composite according to the invention can also comprise all or part of the usual additives customarily used in elastomer compositions intended for the manufacture of pneumatic tyres, such as, for example, plasticizers or extender oils, whether the latter are aromatic or non-aromatic in nature, pigments, protective agents, such as antiozone waxes, chemical antiozonants or antioxidants, or anti-fatigue agents.

Preferably, the elastomeric composition of the composite according to the invention does not comprise cobalt salts or comprises less than 1 phr, preferably less than 0.5 phr, thereof.

Thus, the specific characteristics of the elastomeric composition and of the metallic surface of the composite according to the invention make it possible to achieve and to maintain excellent performance qualities, in particular in terms of adhesion, of hysteresis losses and of resistance to cracking.

Finished or Semi-Finished Article, and Tyre

Another subject matter of the invention is a finished or semi-finished article comprising a composite according to the invention. The finished or semi-finished article can be any article comprising a composite. Mention may be made, for example and in a non-limiting way, of conveyor belts, pneumatic tyres or non-pneumatic tyres.

The pneumatic tyre, which is another subject matter of the invention, has the essential characteristic of comprising the composite in accordance with the invention. The pneumatic tyre can be in the uncured state (before crosslinking of the elastomeric composition) or in the cured state (after crosslinking of the elastomeric composition). Generally, during the manufacture of the pneumatic tyre, the composite is deposited in the uncured state (that is to say, before crosslinking of the elastomeric composition) in the structure of the pneumatic tyre before the stage of curing the pneumatic tyre.

The invention relates in particular to pneumatic tyres intended to equip motor vehicles of passenger vehicle type, SUVs (Sport Utility Vehicles), or two-wheel vehicles (in particular motorcycles), or aircraft, or also industrial vehicles chosen from vans, heavy-duty vehicles, that is to say underground trains, buses, heavy road transport vehicles (lorries, tractors, trailers) or off-road vehicles, such as heavy agricultural vehicles or earthmoving equipment, and others.

Examples

Preparation of the Test Specimens

The tests which follow are carried out in the following way: the diene elastomer, the reinforcing filler and also the various other ingredients, with the exception of the vulcanization system and of the HMT or of the terephthaldehyde when a resin is present in the composition, are successively introduced into an internal mixer (final degree of filling: approximately 70% by volume), the initial vessel temperature of which is approximately 60° C. Thermomechanical working (non-productive phase) is then carried out in one stage, which lasts in total approximately from 3 to 4 min, until a maximum "dropping" temperature of 165° C. is reached.

The mixture thus obtained is recovered and cooled and then sulfur and an accelerator (sulfenamide), and HMT or terephthaldehyde when a resin is present in the composition, are incorporated on a mixer (homofinisher) at 30° C., everything being mixed (productive phase) for an appropriate time (for example between 5 and 12 min).

The compositions thus obtained are subsequently calendered, in the form of plaques (thickness of 2 to 3 mm) or of thin sheets of rubber, and are then either subjected to a curing stage at 150° C. for 15 min, before the measurement of their physical or mechanical properties, or used to prepare the measurement test specimens for the adhesion tests, as described below.

Measurement Methods

Adhesion Test

The elastomeric compositions thus prepared are used to make a composite in the form of a test specimen, according to the protocol described in detail below.

The metal/rubber composite used in this test is a block of elastomeric composition, consisting of two plaques measuring 200 mm by 4.5 mm (millimetres) and with a thickness of 3.5 mm, applied to one another before curing; the thickness of the resulting block is then 7 mm. It is during the manufacture of this block that the reinforcers, for example fifteen in number, are trapped between the two uncured plaques; only a predetermined length of reinforcer, for example 4.5 mm, is left free to come into contact with the elastomeric composition to which this length of reinforcer will be bonded during the curing; the remainder of the length of the reinforcers is isolated from the elastomeric composition (for example using a plastic or metallic film) to prevent any adhesion outside of the predetermined contact zone. Each reinforcer passes right through the block of rubber, a sufficient length (at least 5 cm, for example between 5 and 10 cm) of at least one of its free ends being retained to make possible the subsequent tensile testing of the reinforcer.

Each metallic reinforcer consists of 2 threads of steel having 0.7% of carbon, 30/100ths of a millimetre in diameter, which are twisted together. The coating evaluated is a "brass" coating comprising 63% of copper and the remainder made of zinc.

The block comprising the fifteen reinforcers is then placed in a suitable mould and then cured at 150° C. for 15 minutes, under a pressure of approximately 15 bar.

After curing of the block, the accelerated ageing conditions which follow are applied, making it possible to determine the resistance of the samples to the combined action of heat and humidity: the rubber blocks are placed in an oven at a temperature of 55° C., for 14 days and under a relative humidity of 95%.

Measurement of the Tearing-Out Forces

On conclusion of the curing and of the ageing described above, the block is cut up into test specimens acting as samples, each containing a reinforcer which is pulled out of the rubber block using a tensile testing machine according to the method described in Standard ASTM D 2229-02; the pull rate is 100 mm/min; the adhesion is thus characterized by the force necessary to tear the reinforcer out of the test specimen, at ambient temperature; the tearing-out force represents the mean of the 15 measurements corresponding to the 15 reinforcers of the composite.

The higher the value of the force, the greater the adhesion between the cord and the elastomeric composition. The results are expressed in base 100, with respect to the non-aged control test specimen of composition C01 for the mixtures comprising only carbon black as reinforcing filler and of composition C09 for the mixtures comprising silica. A value greater than that for the non-aged control test specimen, arbitrarily set at 100, indicates an improved result, that is to say a greater tearing-out force than that for the non-aged control test specimen.

Assessment of the Hysteresis Losses

The rolling resistance induced by the test composition is estimated by the measurement of the energy losses, at a temperature of 60° C., of the energy returned at the sixth rebound of a sample on which an initial energy has been imposed, such as described in Standard DIN 53-512 of April 2000. This measurement is calculated as follows: $P60(\%)=100\times(E0-E1)/E0$, where E0 represents the initial energy and E1 the returned energy. The test specimens are tested after curing and after an accelerated ageing at 77° C. for 14 days and 21 days in a ventilated chamber.

The results are expressed in base 100, with respect to the non-aged control test specimen of composition C01 for the mixtures comprising only carbon black as reinforcing filler and of composition C09 for the mixtures comprising silica. A value greater than that for the non-aged control test specimen, arbitrarily set at 100, indicates a degraded result, that is to say a greater hysteresis loss (value of P60) than that for the non-aged control test specimen.

Test of Resistance to Crack Propagation

The rate of cracking was measured on test specimens of the elastomeric compositions C01 to C16 using a cyclic fatigue device (Elastomer Test System) of the 381 type from MTS, as explained below.

The resistance to cracking is measured using repeated tensile actions on a test specimen initially accommodated (after a first tensile cycle) and then notched. The tensile test specimen is composed of a rubber plaque of parallelepipedal shape, for example with a thickness of between 0.5 and 1.5 mm, with a length between 60 and 100 mm and with a width between 4 and 8 mm, the two side edges each being covered in the direction of the length with a cylindrical rubber bead (diameter 5 mm) making possible anchoring in the jaws of the tensile testing device. The test specimens thus prepared are tested after curing and after an accelerated ageing in an oven at 77° C. for 14 days and 21 days in a ventilated chamber. The test was carried out in air, at a temperature of 60° C. After accommodation, 4 very fine notches with a length of between 5 and 7 mm are produced using a razor blade, at mid-width and aligned in the direction of the length of the test specimen, one at each end and two located on either side of the centre of the test specimen, before starting the test. At each tensile cycle, the degree of strain of the test specimen is automatically adjusted so as to keep the energy return rate (amount of energy released during the progression of the crack) constant at a value equal to approximately 1000 $J/m^2$. The crack propagation rate is measured in nanometres per cycle.

The results are expressed in base 100, with respect to the non-aged control test specimen of composition C01 for the mixtures comprising only carbon black as reinforcing filler and of composition C09 for the mixtures comprising silica. A value greater than that for the non-aged test specimen, arbitrarily set at 100, indicates a degraded result, that is to say a greater crack propagation rate than that for the non-aged control test specimen. When the test specimen breaks, the comment "nm" for "not measurable" is shown. This comment testifies to a test specimen exhibiting a low resistance to the propagation of cracks.

Tensile Tests

The tests were carried out in accordance with French Standard NF T 46-002 of September 1988. All the tensile measurements were carried out under the standard conditions of temperature (23±2° C.) and hygrometry (50%±5% relative humidity), according to French Standard NF T 40-101 (December 1979).

At second elongation (that is to say, after accommodation), the nominal secant modulus, calculated by reducing to the initial cross section of the test specimen, (or apparent stress, in MPa) was measured at 10% elongation, denoted MA10, on samples cured at 150° C. for 15 minutes.

The results are expressed in base 100, the value 100 being assigned to the control. A result of greater than 100 indicates that the composition of the example under consideration exhibits a greater stiffness than the control.

Results

The results of measurements carried out on the mixtures C01 to C16 are shown in the tables below. The mixtures C01 to C08 comprise only carbon black as reinforcing filler. The mixtures C09 to C16 comprise only silica as reinforcing filler.

These examples show that the mixtures in accordance with the invention exhibit an excellent compromise of adhesion performance/hysteresis properties/resistance to the propagation of cracks and an improved adhesion when the support is in accordance with the invention.

TABLE 1

| Composition (phr) | C01 | C02 | C03 | C04 | C05 | C06 | C07 | C08 |
|---|---|---|---|---|---|---|---|---|
| NR | 100 | 100 | 100 | 100 | 100 | 100 | 100 | 100 |
| N347 | 50 | 50 | 50 | 50 | 50 | 50 | 50 | 50 |
| 6-PPD | 2 | 2 | 2 | 2 | 2 | 2 | 2 | 2 |
| Stearic acid | 0.5 | 0.5 | 0.5 | 0.5 | 1.5 | 1.5 | 1.5 | 1.5 |
| ZnO | 8 | 8 | 8 | 8 | 4 | 4 | 4 | 4 |
| Zno/Stearic Acid | 16 | 16 | 16 | 16 | 2.7 | 2.7 | 2.7 | 2.7 |
| Cobalt Salts | 1 | 1 | 1 | — | — | — | — | — |
| TBBS | 1.5 | 1.5 | 1.5 | 1.5 | 1 | 1 | 0.75 | 0.75 |
| Sulfur | 6 | 6 | 6 | 6 | 4 | 4 | 3 | 3 |
| Resorcinol | | 1 | | | | | | |
| HMT | | 0.5 | | | | | | |
| Phloroglucinol | | | 1 | 1 | | 1 | | 1 |
| Terephthaldehyde | | | 2 | 2 | | 2 | | 2 |
| Measurement results - Base 100 Stiffness | | | | | | | | |
| MA10 (23° C.) | 100 | 139 | 94 | 79 | 77 | 63 | 64 | 55 |
| "Ternary" coating adhesion - Ageing at 55° C. and 95% RH | | | | | | | | |
| T= 0 d | 100 | 96 | 93 | 96 | 111 | 106 | 99 | 106 |
| T = 14 d | 59 | 35 | 62 | 58 | 85 | 91 | 97 | 98 |
| "Brass" coating adhesion - Ageing at 55° C. and 95% RH | | | | | | | | |
| T=0d | 100 | 104 | 96 | 101 | 108 | 100 | 110 | 94 |
| T = 14 d | 35 | 23 | 51 | 47 | 41 | 65 | 41 | 77 |
| Hysteresis - Ageing at 77° C. under air | | | | | | | | |
| T= 0 d | 100 | 114 | 121 | 102 | 97 | 96 | 100 | 113 |
| T = 14 d | 118 | 124 | 136 | 112 | 102 | — | 104 | — |
| T = 21 d | 132 | 124 | 142 | 118 | 111 | — | 110 | — |
| Cracking - Ageing at 77° C. under air - G = 1000 $J/m^2$ | | | | | | | | |
| T= 0 d | 100 | 47 | 3 | 3 | 14 | 3 | 5 | 5 |
| T = 14 d | 3081 | nm | 1889 | 332 | 382 | — | 8 | — |
| T = 21 d | nm | nm | nm | nm | 752 | — | 10 | — |

—: not measured; nm: not measurable

TABLE 2

| Composition (phr) | C09 | C10 | C11 | C12 | C13 | C14 | C15 | C16 |
|---|---|---|---|---|---|---|---|---|
| NR | 100 | 100 | 100 | 100 | 100 | 100 | 100 | 100 |
| N347 | | | | | | | | |
| Silica 160MP | 45 | 45 | 45 | 45 | 45 | 45 | 45 | 45 |
| Silane | 8.5 | 8.5 | 8.5 | 8.5 | 8.5 | 8.5 | 8 | 8 |
| DPG | 1 | 1 | 1 | 1 | 1 | 1 | 1.25 | 1.25 |
| 6-PPD | 2 | 2 | 2 | 2 | 2 | 2 | 2 | 2 |
| Stearic acid | 0.5 | 0.5 | 0.5 | 0.5 | 0.5 | 0.5 | 1.5 | 1.5 |
| ZnO | 8 | 8 | 8 | 8 | 8 | 8 | 4 | 4 |
| ZnO/Stearic Acid | 16 | 16 | 16 | 16 | 16 | 16 | 2.7 | 2.7 |
| Cobalt Salts | 1 | 1 | 1 | — | — | — | — | — |
| TBBS | 1.5 | 1.5 | 1.5 | 1.5 | 1.5 | 1.5 | 1.5 | 1.5 |
| Sulfur | 6 | 6 | 6 | 6 | 6 | 6 | 2 | 2 |
| Resorcinol | | 1 | | | 1 | | | |

TABLE 2-continued

| Composition (phr) | C09 | C10 | C11 | C12 | C13 | C14 | C15 | C16 |
|---|---|---|---|---|---|---|---|---|
| HMT | | 0.5 | | | 0.5 | | | |
| Phloroglucinol | | | 1 | | | 1 | | 1 |
| Terephthaldehyde | | | 2 | | | 2 | | 2 |
| Measurement results - Base 100 Stiffness | | | | | | | | |
| MA10 (23° C.) | 100 | 108 | 93 | 108 | 129 | 82 | 56 | 56 |
| "Ternary" coating adhesion - Ageing at 55° C. and 95% RH | | | | | | | | |
| T = 0 d | 100 | 105 | 114 | 91 | 100 | 105 | 38 | 99 |
| T = 14 d | 61 | 38 | 77 | 45 | 29 | 64 | 27 | 93 |
| Hysteresis - Ageing at 77° C. under air | | | | | | | | |
| T= 0 d | 100 | 125 | 122 | 92 | 123 | 100 | 75 | 110 |
| T = 14 d | 125 | 131 | 141 | 106 | 129 | 118 | 87 | — |
| T = 21 d | 125 | 132 | 144 | 105 | 127 | 119 | 92 | — |
| Cracking - Ageing at 77° C. under air - G = 1000 J/m2 | | | | | | | | |
| T= 0 d | 100 | 156 | 20 | 491 | 538 | 51 | 10 | 10 |
| T = 14 d | 21 238 | 53 115 | 5701 | nm | nm | 324 | — | — |
| T = 21 d | nm | nm | nm | nm | nm | 284 | — | — |

—: not measured; nm: not measurable

The invention claimed is:

1. A composite comprising at least one reinforcing element exhibiting a surface comprising an alloy of copper and zinc, the reinforcing element being embedded in an elastomeric composition based on at least a diene elastomer, a reinforcing filler, a sulfur crosslinking system and a phenol/aldehyde resin based on:

at least one aromatic polyphenol comprising at least one aromatic nucleus bearing at least two hydroxyl functions in a meta position with respect to each other, the two positions ortho to at least one of the hydroxyl functions being unsubstituted, and at least one dialdehyde compound comprising two aldehyde functions, in which a content of phenol/aldehyde resin is less than 10 phr.

2. The composite according to claim 1, wherein the at least one dialdehyde compound comprises at least one aromatic nucleus, which is optionally substituted.

3. The composite according to claim 2, wherein two positions meta to at least one aldehyde function are unsubstituted.

4. The composite according to claim 2, wherein the at least one dialdehyde compound is selected from compounds comprising an aromatic nucleus having 6 carbon atoms.

5. The composite according to claim 1, wherein the sulfur crosslinking system comprises a metal oxide, a stearic acid derivative and a vulcanization accelerator, a sulfur content being between 1 and 5 phr, and a ratio by weight of metal oxide to stearic acid derivative being less than 3.

6. The composite according to claim 5, wherein a sulfur/vulcanization accelerator ratio by weight is less than or equal to 5.

7. The composite according to claim 1, wherein the surface of the at least one reinforcing element comprises from 55% to 75% by weight of copper.

8. The composite according to claim 1, wherein the elastomeric composition comprises at least 50 phr of at least one isoprene elastomer.

9. The composite according to claim 1, wherein the elastomeric composition comprises from 1 to 4 phr of sulfur.

10. The composite according to claim 1, wherein the elastomeric composition does not comprise cobalt salts or comprises less than 1 phr thereof.

11. The composite according to claim 1, wherein the reinforcing filler of the elastomeric composition comprises carbon black.

12. The composite according to claim 1, wherein the reinforcing filler of the elastomeric composition comprises silica.

13. The composite according to claim 12, wherein the elastomeric composition comprises an agent for coupling the silica, a content of coupling agent being in a range extending from 5% to 18% by weight, with respect to an amount of silica.

14. A finished or semi-finished article comprising the composite according to claim 1.

15. A pneumatic tire comprising the composite according to claim 1.

* * * * *